(12) United States Patent
Yoshida

(10) Patent No.: US 11,029,479 B2
(45) Date of Patent: Jun. 8, 2021

(54) LENS BARREL AND OPTICAL APPARATUS

(71) Applicant: CANON KABUSHIKI KAISHA, Tokyo (JP)

(72) Inventor: Shinsuke Yoshida, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 231 days.

(21) Appl. No.: 16/257,163

(22) Filed: Jan. 25, 2019

(65) Prior Publication Data
US 2019/0235194 A1 Aug. 1, 2019

(30) Foreign Application Priority Data
Jan. 30, 2018 (JP) .............................. JP2018-013858

(51) Int. Cl.
*G02B 7/02* (2021.01)
*G02B 13/06* (2006.01)
*H04N 5/225* (2006.01)

(52) U.S. Cl.
CPC ............. *G02B 7/021* (2013.01); *G02B 13/06* (2013.01); *H04N 5/2254* (2013.01)

(58) Field of Classification Search
CPC . G02B 7/102; G02B 7/10; G02B 7/08; G02B 15/14; G02B 7/023; G02B 7/04;
(Continued)

(56) References Cited

U.S. PATENT DOCUMENTS

2012/0044580 A1* 2/2012 Suzuki .................. G03B 17/02
359/700
2013/0242410 A1* 9/2013 Hsueh ...................... G02B 7/04
359/700
(Continued)

FOREIGN PATENT DOCUMENTS

CN 101796446 A 8/2010
CN 101813816 A 8/2010
(Continued)

OTHER PUBLICATIONS

Mar. 31, 2021 Chinese Office Action, which is enclosed with an English Translation, that issued in Chinese Patent Application No. 201910086051.3.

*Primary Examiner* — William R Alexander
*Assistant Examiner* — Sharrief I Broome
(74) *Attorney, Agent, or Firm* — Cowan, Liebowitz & Latman, P.C.

(57) ABSTRACT

A lens barrel includes a first guide barrel, a first cam barrel, a linear movement barrel, a second guide barrel configured to guide a linear movement of the linear movement barrel in the optical axis direction, and a second cam barrel movable in the optical axis direction as the second guide barrel moves in the optical axis direction, and rotatable around the optical axis relative to the second guide barrel, and the second cam barrel including a second cam configured to move the linear movement barrel in the optical axis direction by a rotation of the second cam barrel. The linear movement barrel is disposed between the second guide barrel disposed on an outer circumference of the linear movement barrel and the second cam barrel disposed on an inner circumference of the linear movement barrel.

8 Claims, 10 Drawing Sheets

(58) Field of Classification Search
CPC ...... G02B 7/02; G02B 13/001; G02B 13/009; G02B 15/177; G02B 7/021; G02B 23/14; G02B 7/1805; G02B 13/0045; G02B 13/0065; G02B 13/16; G02B 15/00; G02B 15/08; G02B 15/142; G02B 15/167
See application file for complete search history.

(56) References Cited

U.S. PATENT DOCUMENTS

| | | | |
|---|---|---|---|
| 2015/0160430 A1* | 6/2015 | Okuda | G02B 7/10 |
| | | | 359/695 |
| 2017/0153412 A1* | 6/2017 | Ohmori | G02B 7/10 |

FOREIGN PATENT DOCUMENTS

| | | |
|---|---|---|
| CN | 102628979 A | 8/2012 |
| JP | 2000-111786 A | 4/2000 |

\* cited by examiner

LENS BARREL AND OPTICAL APPARATUS

BACKGROUND OF THE INVENTION

Field of the Invention

The present invention relates to a lens barrel and an optical apparatus using the same, such as an interchangeable lens and an imaging apparatus.

Description of the Related Art

Some lens barrels have a zoom mechanism configured to change an imaging angle of view by moving a plurality of lens units in an imaging optical system in an optical axis direction (or by changing intervals among the plurality of lens units). It is necessary for a higher zoom magnification in this lens barrel to increase a moving amount of each lens unit. A multi-retractable configuration of the lens barrel is used for a larger moving amount of each lens unit, whereas the lens barrel is also demanded for a small configuration.

Japanese Patent Application Laid-Open No. ("JP") 2000-111786 discloses a lens barrel having a small multi-retractable configuration by eliminating dedicated part constituting an exterior appearance.

However, in the lens barrel disclosed in JP 2000-111786, end surfaces in the optical axis direction of a plurality of pairs of guide barrels (linear movement restricting barrels) and cam barrels (rotating barrels) expose to the outside, and unnecessary light is likely to enter a lens barrel through gaps among them.

SUMMARY OF THE INVENTION

The present invention provides a compact lens barrel which can secure a good light shielding performance and move a plurality of lens units (lens systems).

A lens barrel according to one aspect of the present invention includes a first guide barrel configured to guide a linear movement of a first lens system in an optical axis direction, a first cam barrel rotatable around an optical axis relative to the first guide barrel and including a first cam configured to move the first lens system in the optical axis direction by a rotation of the first cam barrel, a linear movement barrel configured to hold a second lens system, a second guide barrel whose linear movement in the optical axis direction is guided by the first guide barrel, the second guide barrel being configured to guide a linear movement of the linear movement barrel in the optical axis direction, and a second cam barrel movable in the optical axis direction as the second guide barrel moves in the optical axis direction, and rotatable around the optical axis relative to the second guide barrel, and the second cam barrel including a second cam configured to move the linear movement barrel in the optical axis direction by a rotation of the second cam barrel. The linear movement barrel is disposed between the second guide barrel disposed on an outer circumference of the linear movement barrel and the second cam barrel disposed on an inner circumference of the linear movement barrel.

An optical apparatus including the above lens barrel constitutes another aspect of the present invention.

Further features of the present invention will become apparent from the following description of exemplary embodiments with reference to the attached drawings.

DESCRIPTION OF THE EMBODIMENTS

Figure 1:
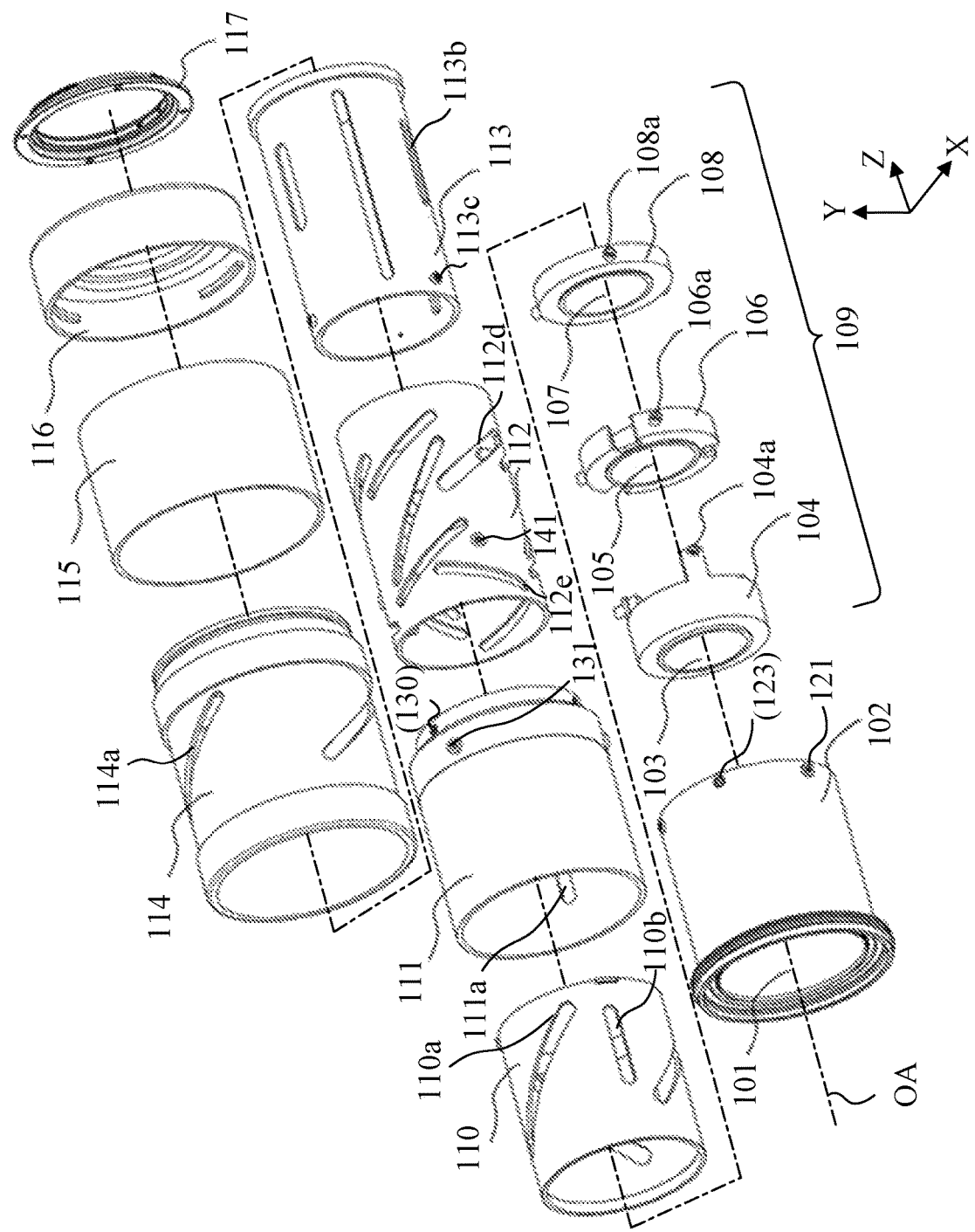
FIG. 1 is an exploded perspective view of a lens barrel according to an embodiment of the present invention.

Referring now to the accompanying drawings, a description will be given of embodiments according to the present invention. FIG. 1 is an exploded view of a lens barrel according to one embodiment of the present invention. An interchangeable lens as an optical apparatus is configured with the lens barrel. A lens barrel having the same structure as that in this embodiment may be used for a lens integrated camera as an optical apparatus.

Figure 2A:
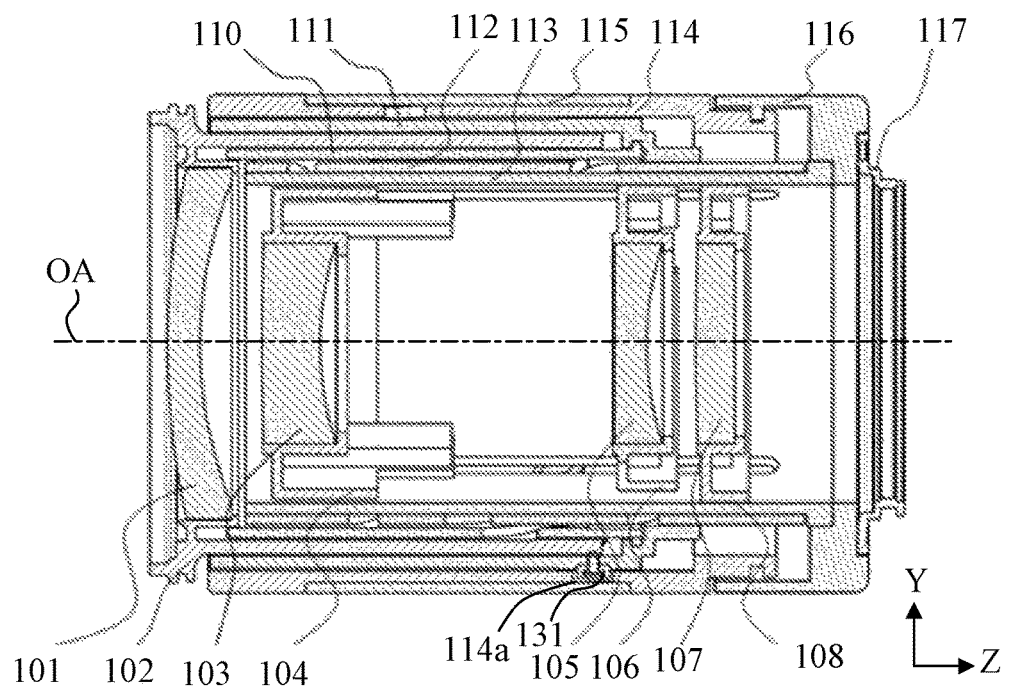
FIG. 2A is a sectional view of the lens barrel in a wide-angle state according to the embodiment.
Figure 2B:
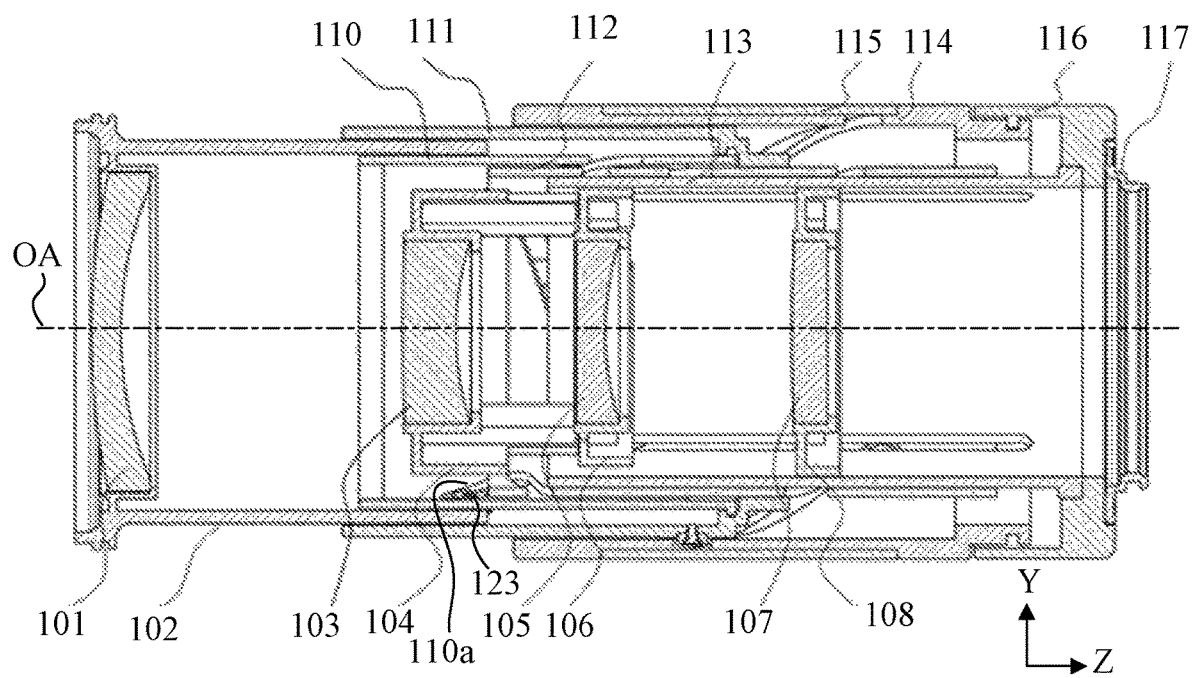
FIG. 2B is a sectional view of the lens barrel in a telephoto state according to the embodiment.

FIGS. 2A and 2B illustrate sections of the wide-angle (end) state and the telephoto (end) state in the lens barrel according to this embodiment. In this embodiment, the wide-angle state and the telephoto state are synonymous with the retracted state and the extended state described later, respectively. In the figure, OA represents an optical axis of a lens barrel (or an imaging lens described later), and a direction in which the optical axis OA extends will be referred to as an optical axis direction. A direction orthogonal to the optical axis direction will be referred to as a radial direction, and a direction around the optical axis will be also referred to as a circumferential direction or a rotating direction.

A description will now be given of a configuration of the imaging lens held by the lens barrel. The imaging lens includes, in order from an object side to an image side, a first lens unit 101, a second lens unit 103, a third lens unit 105, and a fourth lens unit 107. A plurality of lens units including the second lens unit 103, the third lens unit 105, and the fourth lens unit 107 will be referred to as a first lens system 109. The first lens unit 101 corresponds to a second lens system.

The first lens unit 101 is held by a linear movement barrel 102 movable in the optical axis direction. The second lens unit 103, the third lens unit 105, and the fourth lens unit 107 are held by the second holding barrel 104, the third holding barrel 106, and the fourth holding barrel 108, respectively.

The positions of the second lens system 101 (linear movement barrel 102) and the first lens system 109 (the second holding barrel 104, the third holding barrel 106, and the fourth holding barrel 108) in the optical axis direction are controlled by the first guide barrel 113 and the first cam barrel 112. The first guide barrel 113 is fixed to a fixed barrel 116 together with a mount 117 detachably attached to an unillustrated lens interchangeable type camera. The fixed barrel 116 holds the operating ring 114 rotatably around the optical axis at a fixed position in the optical axis direction.

As the user rotates the operating ring 114, the first and second lens systems 109 and 101 move to positions in the optical axis direction corresponding to the rotation angles of the operating ring 114. Thereby, imaging at an angle of view (zoom position) desired by the user is enabled.

Figure 3:
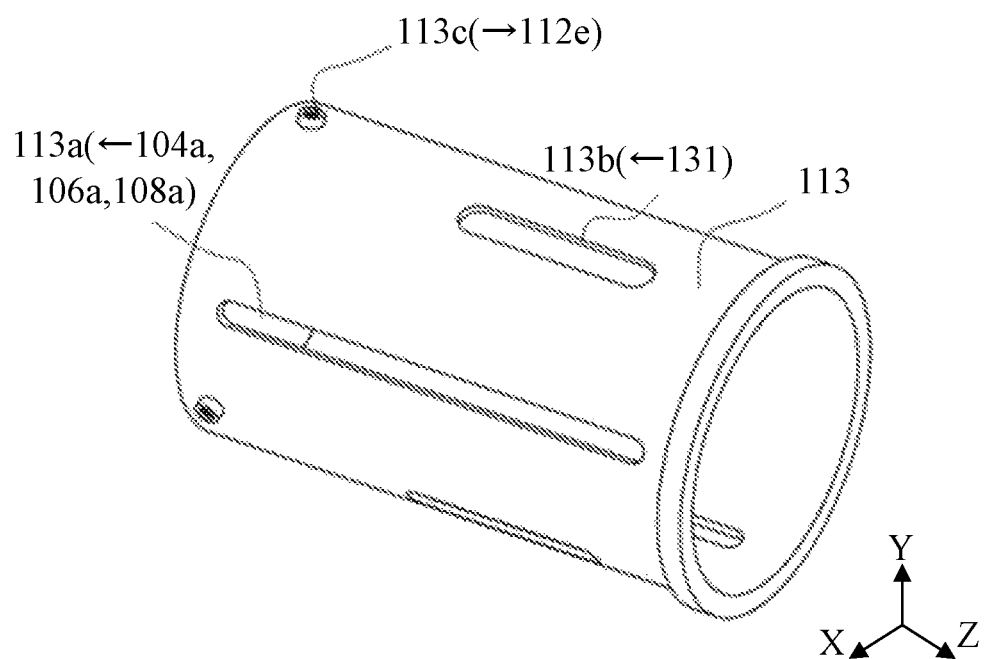
FIG. 3 is a perspective view of a first guide barrel according to the embodiment.
Figure 4:
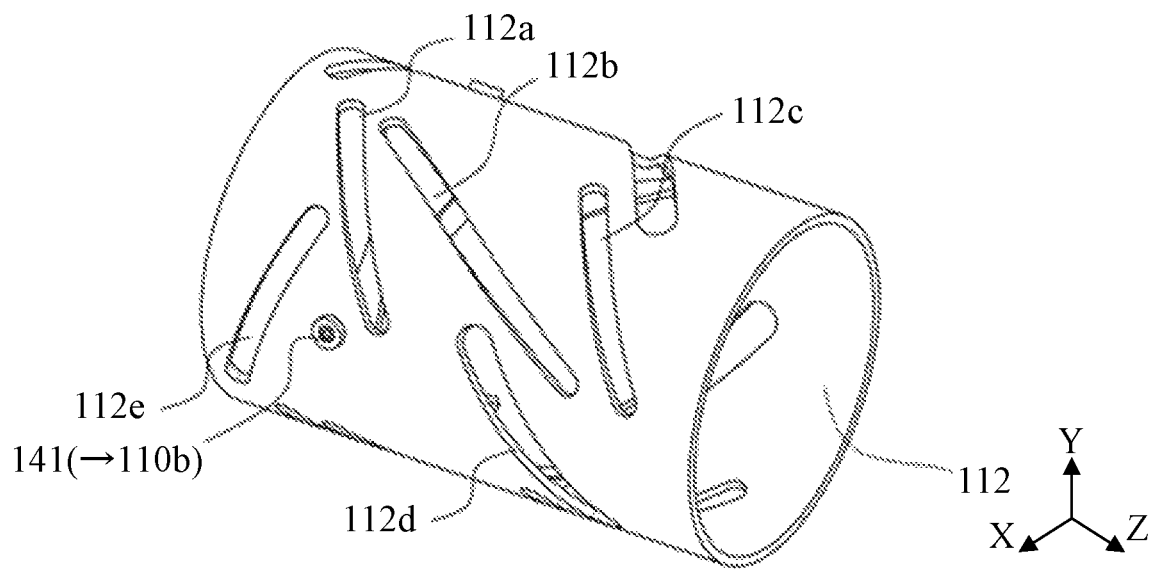
FIG. 4 is a perspective view of a first cam barrel according to the embodiment.
Figure 5A:
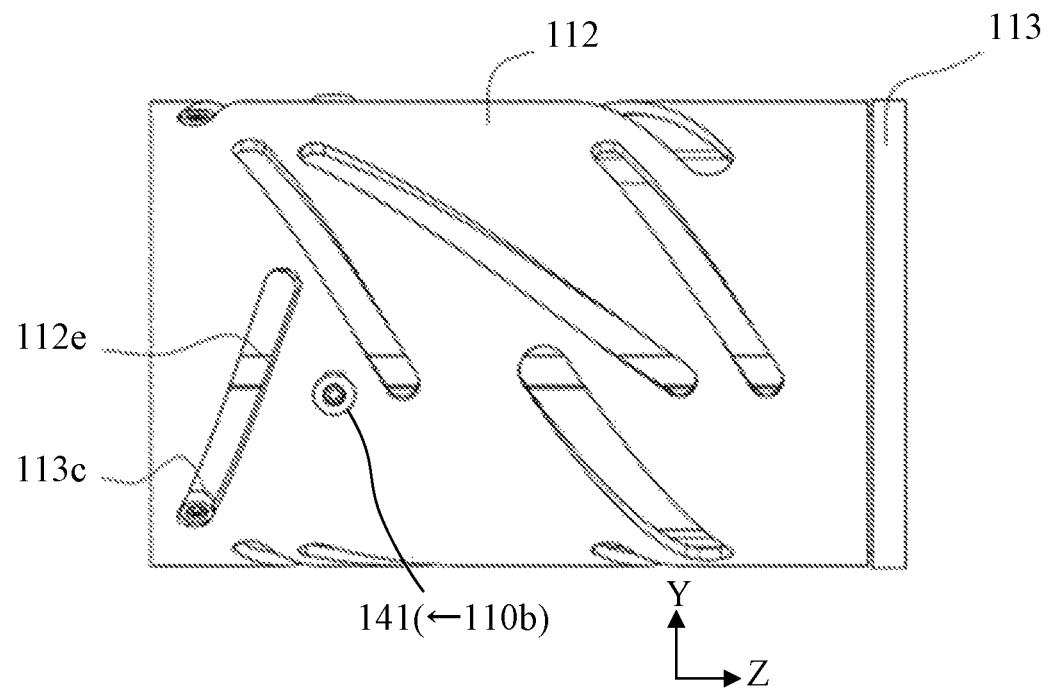
FIG. 5A is a side view of the first guide barrel and the first cam barrel in the wide-angle state according to the embodiment.
Figure 5B:
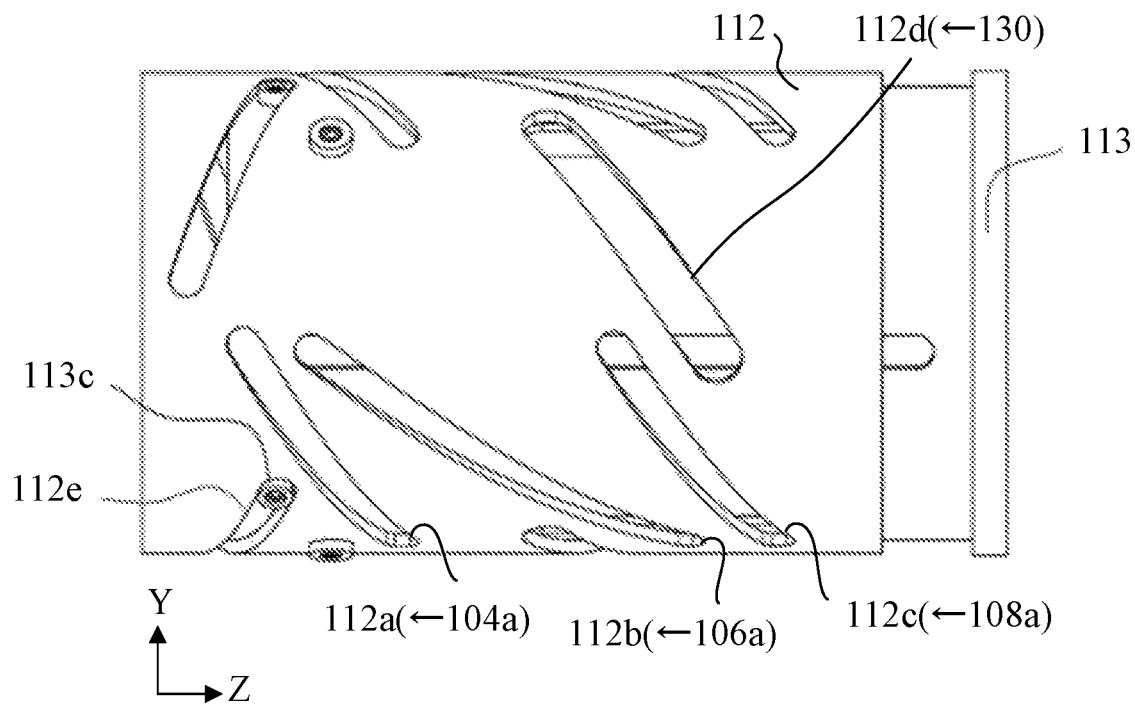
FIG. 5B is a side view of the first guide barrel and the first cam barrel in the telephoto state according to the embodiment.

FIGS. 3 and 4 illustrate the first guide barrel 113 and the first cam barrel 112, respectively. FIGS. 5A and 5B illustrate the positional relationship of the first guide barrel 113 and the first cam barrel 112 in the optical axis direction in the wide-angle state and the telephoto state, respectively. The cam groove portions, the guide groove portions, and the cam followers, which will be described below, are provided at three positions at substantially regular intervals in the circumferential direction in each cam barrel, each guide barrel, operating ring, and each holding barrel.

The first guide barrel 113 includes a second guide groove portion 113a extending in the optical axis direction. A first cam barrel 112 is disposed on the outer circumference of the first guide barrel 113, rotatable around the optical axis relative to the first guide barrel 113, and engaged with it in a radial direction.

The first cam barrel 112 includes a second cam groove portion 112a, a third cam groove portion 112b, and a fourth cam groove portion 112c. The second, third and fourth cam groove portions 112a, 112b, and 112c correspond to the first cam. A second cam follower 104a provided on the second holding barrel 104 is engaged with the second guide groove portion 113a and the second cam groove portion 112a. A third cam follower 106a provided on the third holding barrel 106 is engaged with the second guide groove portion 113a and the third cam groove portion 112b. A fourth cam follower 108a provided on the fourth holding barrel 108 is engaged with the second guide groove portion 113a and the fourth cam groove portion 112c. Due to this configuration, as the first cam barrel 112 rotates, the first lens system 109 moves in the optical axis direction.

The first guide barrel 113 includes a fifth cam follower 113c. The fifth cam follower 113c is engaged with the fifth cam groove portion 112e provided in the first cam barrel 112. Due to this configuration, as the first cam barrel 112 rotates around the optical axis, the fifth cam follower 113c is pressed by the fifth cam groove portion 112e and the first cam barrel 112 is moved in the optical axis direction relative to the first guide barrel 113. The fifth cam follower 113c and the fifth cam groove portion 112e constitute a second cam mechanism.

The first guide barrel 113 further includes a sixth guide groove portion 113b extending in the optical axis direction.

A sixth cam follower 130 provided on a second guide barrel 111 (to be described later) is engaged with the sixth guide groove portion 113b.

The second, third, and fourth cam groove portions 112a, 112b, and 112c in the first cam barrel 112 are formed such that a sum of their lifts and a moving amount of the first cam barrel 112 in the optical axis direction is moving amounts of the second, third, and fourth lens units 103, 105, and 107 in the same direction. This configuration can make small the moving amounts of the second, third, and fourth lens units 103, 105, and 107 by the second, third, and fourth cam groove portions 112a, 112b, and 112c relative to the rotation amount of the first cam barrel 112, and moderate intersection angles of the second, third, and fourth cam groove portions 112a, 112b, and 112c relative to the optical axis direction. The moderate intersection angles can reduce the moving amounts of the second, third, and fourth lens units 103, 105, and 107 per unit rotating amount of the first cam barrel 112. As a result, a dimension error between each cam groove portion and the cam follower engaged with it can reduce an inclination amount relative to the optical axis of the lens unit moved in the optical axis direction by the cam groove portion.

The first cam barrel 112 further includes a sixth cam groove portion 112d. A sixth cam follower 130 provided at the inner circumferential rear end portion of the second guide barrel 111 is engaged with the sixth cam groove portion 112d. The sixth cam groove portion 112d and the sixth cam follower 130 constitute a first cam mechanism.

The second cam barrel 110 is disposed rotatably relative to the first cam barrel 112 and engaged with it in a radial direction on the outer circumference of the first cam barrel 112. The second guide barrel 111 is disposed and spaced from the second cam barrel 110 by a predetermined interval in the radial direction around the outer circumference of the second cam barrel 110. The linear movement barrel 102 is disposed in this gap (space) or between the second guide barrel 111 and the second cam barrel 110. The second cam barrel 110 and the first cam barrel 112 constitute a first stage retractable portion.

Figure 6A:
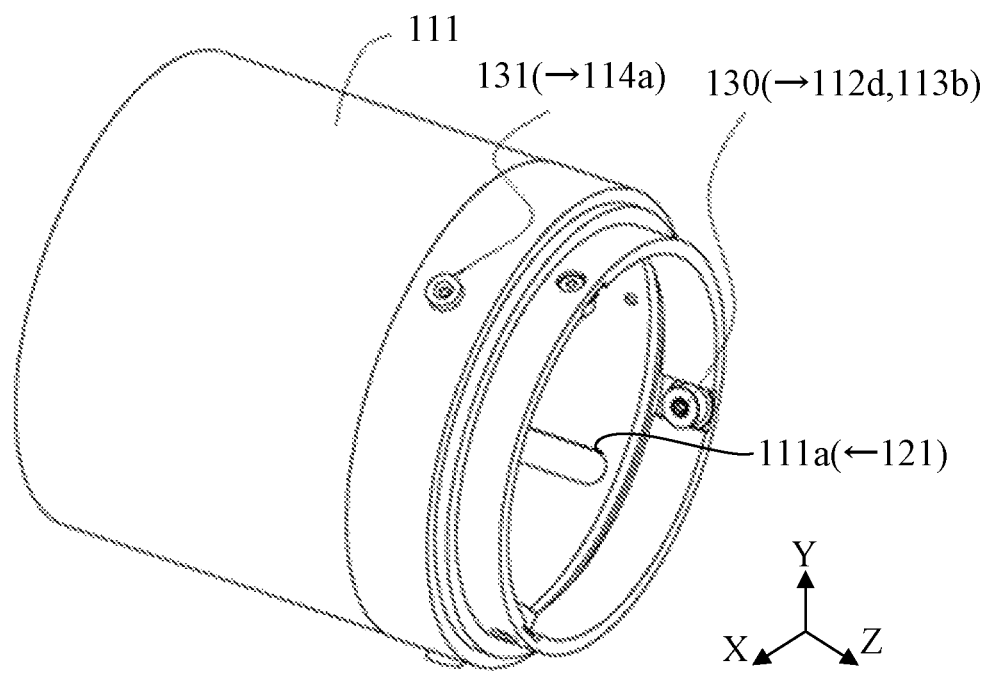
FIG. 6A is a perspective view of a second guide barrel according to the embodiment.
Figure 6B:
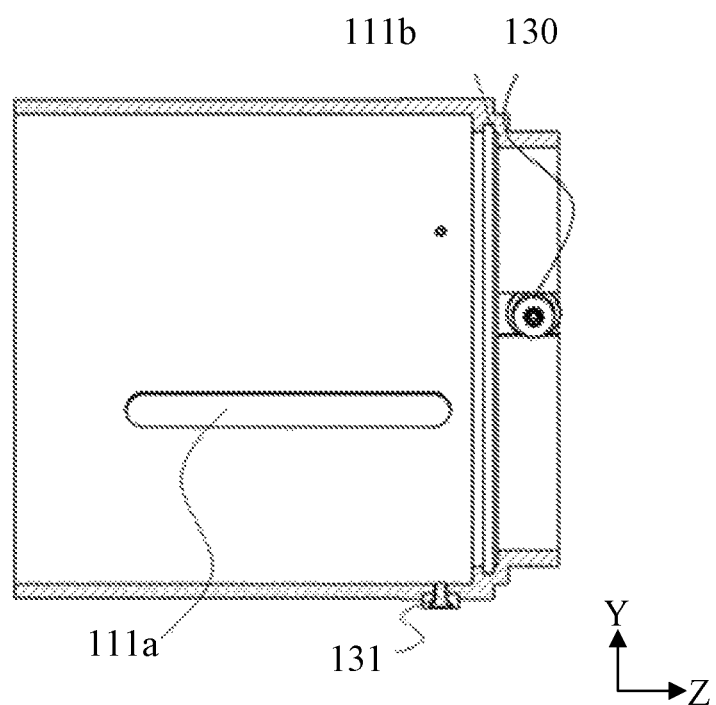
FIG. 6B is a sectional view of the second guide barrel according to the embodiment.
Figure 7:
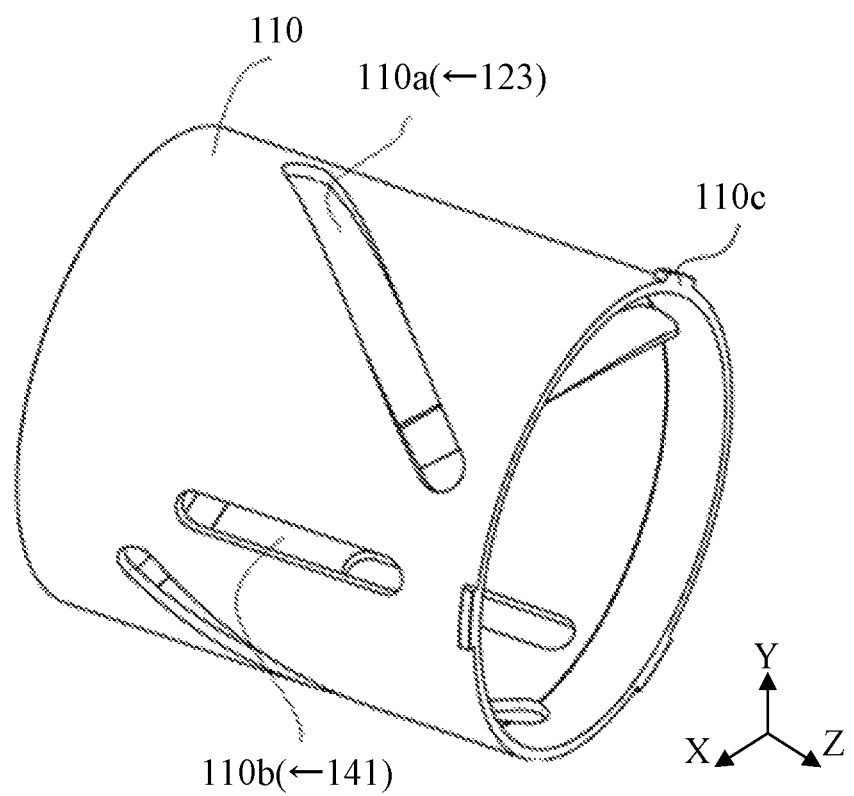
FIG. 7 is a perspective view of a second cam barrel according to the embodiment.

FIGS. 6A, 6B, and 7 illustrate the second guide barrel 111 and the second cam barrel 110, respectively. The second guide barrel 111 includes a third guide groove portion 111a extending in the optical axis direction. The second guide barrel 111 includes a bayonet groove portion 111b on the inner circumference of the end portion on the image side (rear side).

The second cam barrel 110 includes a first cam groove portion 110a (corresponding to a second cam). The second cam barrel 110 includes bayonet claws 110c at three positions at substantially regular intervals in the circumferential direction on the outer circumferential rear end portion. These bayonet claws 110c are engaged with a bayonet groove portion 111b formed so as to extend in the circumferential direction at the inner circumferential rear end portion of the second guide barrel 111. Thereby, the second guide barrel 111 holds the second cam barrel 110 movably together in the optical axis direction and rotatably around the optical axis.

Figure 8A:
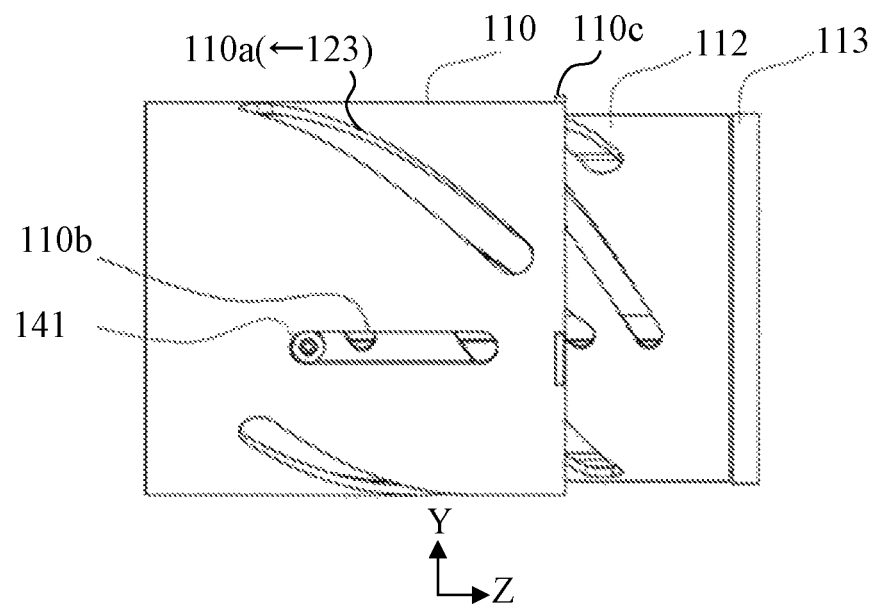
FIG. 8A is a side view of the second cam barrel and a second guide barrel in the wide-angle state according to the embodiment.
Figure 8B:
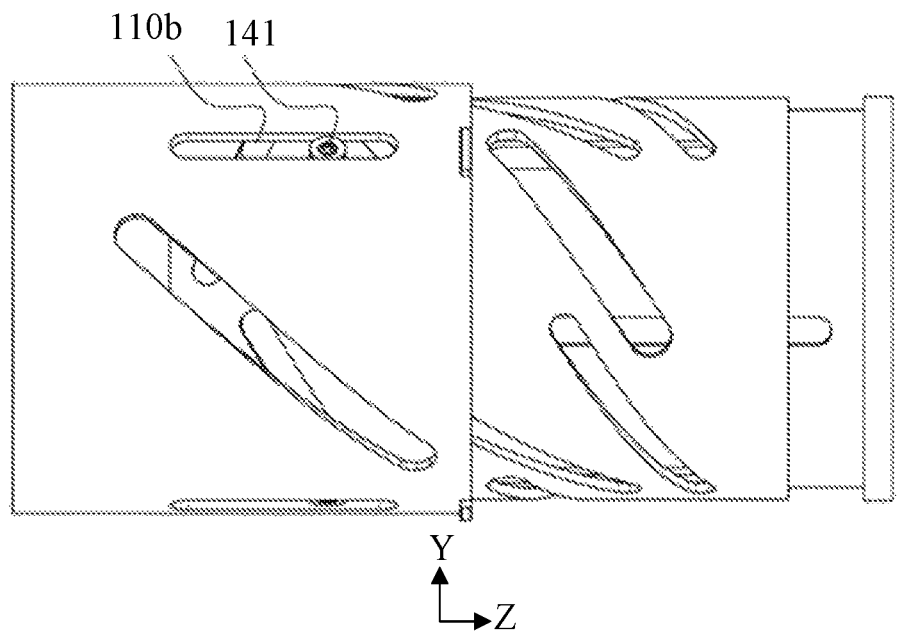
FIG. 8B is a side view of the second cam barrel and the second guide barrel in the telephoto state according to the embodiment.

This embodiment connects the second cam barrel 110 to the first cam barrel 112, and thereby rotates the second cam barrel 110. FIGS. 8A and 8B illustrate the second cam barrel 110 in addition to the first guide barrel 113 and the first cam barrel 112 in the wide-angle state and the telephoto state illustrated in FIGS. 5A and 5B, respectively. The first cam barrel 112 includes a rotation connecting pin 141 as illustrated in FIGS. 4, 5A, and 5B. On the other hand, the second cam barrel 110 includes a rotation connecting groove portion 110b linearly extending in the optical axis direction, and the rotation connecting pin 141 is engaged with the rotation connecting groove portion 110b. Thereby, the second cam barrel 110 can rotate in association with the rotation of the first cam barrel 112 around the optical axis. In other words, the second cam barrel 110 rotates around the optical axis integrally with the first cam barrel 112, and moves integrally with the second guide barrel 111 relative to the first cam barrel 112 in the optical axis direction.

According to this embodiment, the rotation connecting groove portion 110b in the second cam barrel 110 linearly extends only in the optical axis direction and does not have a cam function. However, forming the rotation connecting groove portion 110b as a cam groove portion tilted to the optical axis direction would be able to rotate the first cam barrel 112 and the second cam barrel 110 with different rotating amounts.

The conventional lens barrel arranges the second cam barrel 110 and the second guide barrel 111 on the outer circumference of the first cam barrel 112 so that they are adjacent to each other in the radial direction. The cam follower of the linear movement barrel 102 is engaged with the cam groove portion in the cam barrel corresponding to the second cam barrel 110 and the guide groove portion in the guide barrel corresponding to the second guide barrel 111 so that the barrel 102 can move in the optical axis direction.

However, when the linear movement barrel 102 is extended in this configuration, as illustrated in FIG. 2B, the cam groove portion and the guide groove portion expose to the outside. Thus, a decorative barrel was provided so as to cover them and prevent them from exposing to the outside. The decorative barrel increases the outer diameter of the lens barrel, since the number of parts in the radial direction increased by one layer.

When the linear movement barrel 102 is disposed on the inner circumference of the second cam barrel 110 and the second guide barrel 111, unnecessary light (stray light) intrudes into the lens barrel from the gap between the second cam barrel 110 and the second guide barrel 111 whether the lens barrel is in the retracted state or in the extending state. This unnecessary light lowers the image quality of the captured image. It is thus necessary to dispose a light-shielding sealant between the second cam barrel 110 and the second guide barrel 111.

Figure 10A:
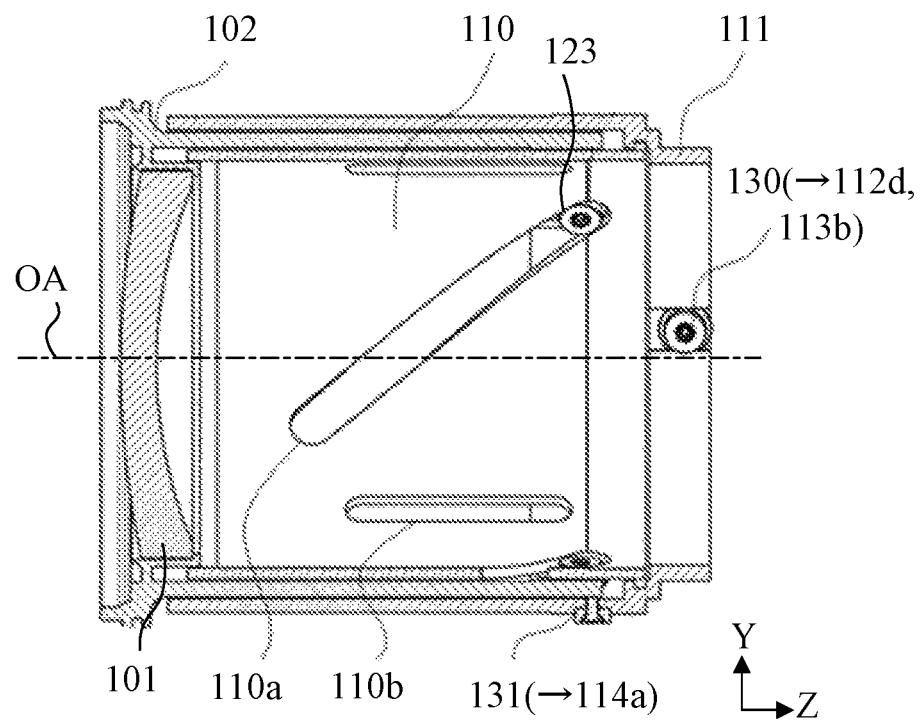
FIG. 10A illustrates the linear movement barrel and the second guide barrel in the wide-angle state according to the embodiment.
Figure 10B:
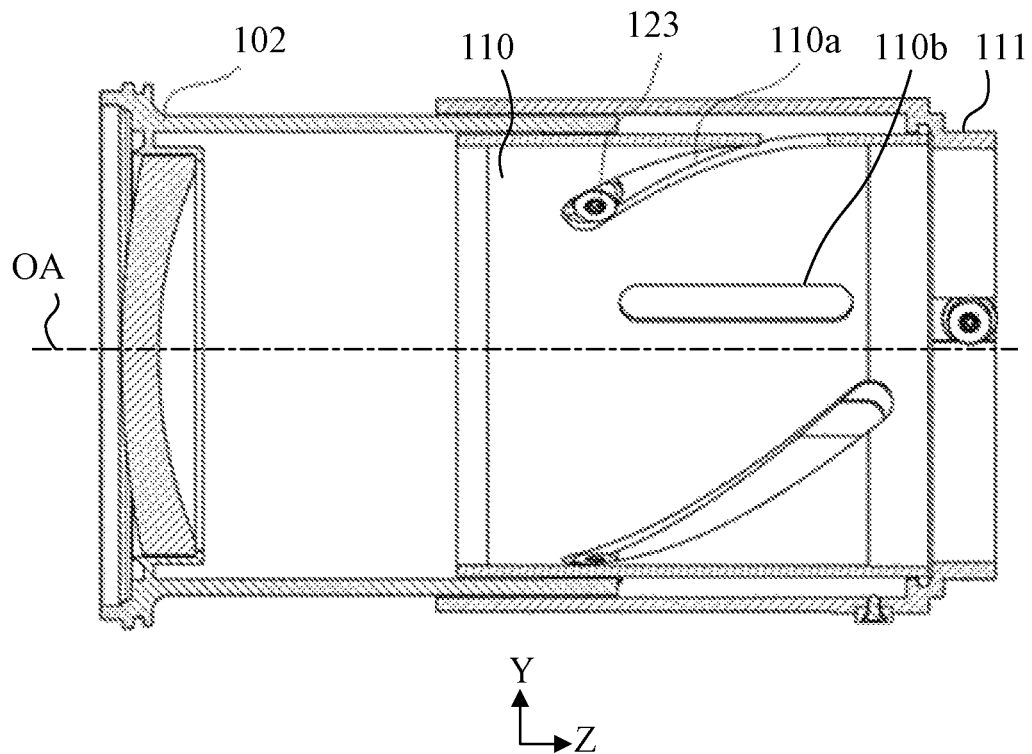
FIG. 10B illustrates the linear movement barrel and the second guide barrel in the telephoto state according to the embodiment.

This embodiment arranges, in order from a radially inner side, as illustrated in FIGS. 10A and 10B, the second cam barrel 110, the linear movement barrel 102, and the second guide barrel 111. In other words, the linear movement barrel 102 is held between the second cam barrel 110 and the second guide barrel 111. Thereby, as the second guide barrel 111 is extended in the optical axis direction relative to the first guide barrel 113, the outer circumferential surface of the second guide barrel 111 becomes the outermost surface of the lens barrel.

As understood from FIGS. 6A and 6B, the third guide groove portion 111a provided in the second guide barrel 111 is formed as a bottomed groove portion which opens radially inwardly and does not perforate the second guide barrel 111 in the radial direction. When the cam groove portion extends long in the rotating direction, a wide range of worked trace appears. Hence, the second guide barrel 111 having no cam groove portion disposed on the outer circumference of the linear movement barrel 102 is more suitable for a nice appearance than a combination of the cam groove portion formed as the bottomed cam groove and the second cam barrel 112 disposed on the outer circumference of the linear movement barrel 102.

Figure 9:
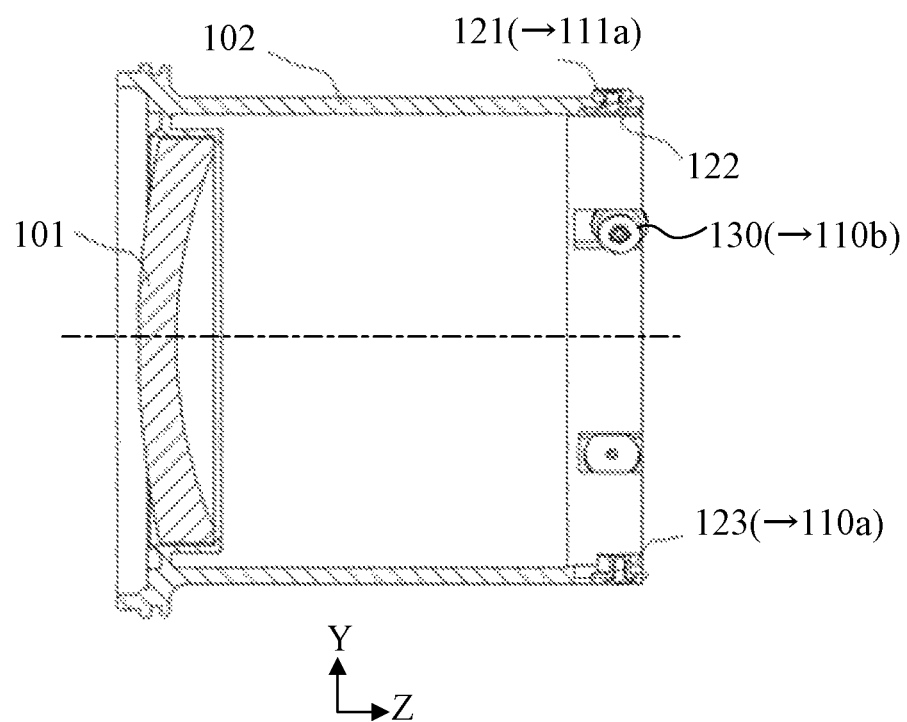
FIG. 9 is a sectional view of a linear movement barrel according to the embodiment.

As illustrated in FIGS. 10A and 10B, the first cam follower 123 provided on the linear movement barrel 102 is engaged with the first cam groove portion 110a in the second cam barrel 110. As illustrated in FIG. 9, the first linear movement follower 121 provided on the linear movement barrel 102 is engaged with a third guide groove portion 111a (FIG. 2B) in the second guide barrel 111. Due to this configuration, as the second cam barrel 110 rotates around the optical axis, the linear movement barrel 102 linearly moves in the optical axis direction.

Furthermore, due to this configuration, even when the linear movement barrel 102 is extended as illustrated in FIG. 2B, none of the cam groove portion and the guide groove portion expose to the outside. Therefore, no decorative barrel is necessary which prevents them from exposing to the outside. As a result, it is possible to reduce the number of components by one layer in comparison with the conventional lens barrel, so that the outer diameter of the lens barrel can be reduced.

In addition, since the second guide barrel 111 and the second cam barrel 112 are not adjacent to each other in the radial direction (the linear movement barrel 102 is disposed therebetween), stray light is less likely to enter the lens barrel through the gap between the second guide barrel 111 and the second cam barrel 112 and no light-shielding sealant is necessary.

Figure 11:
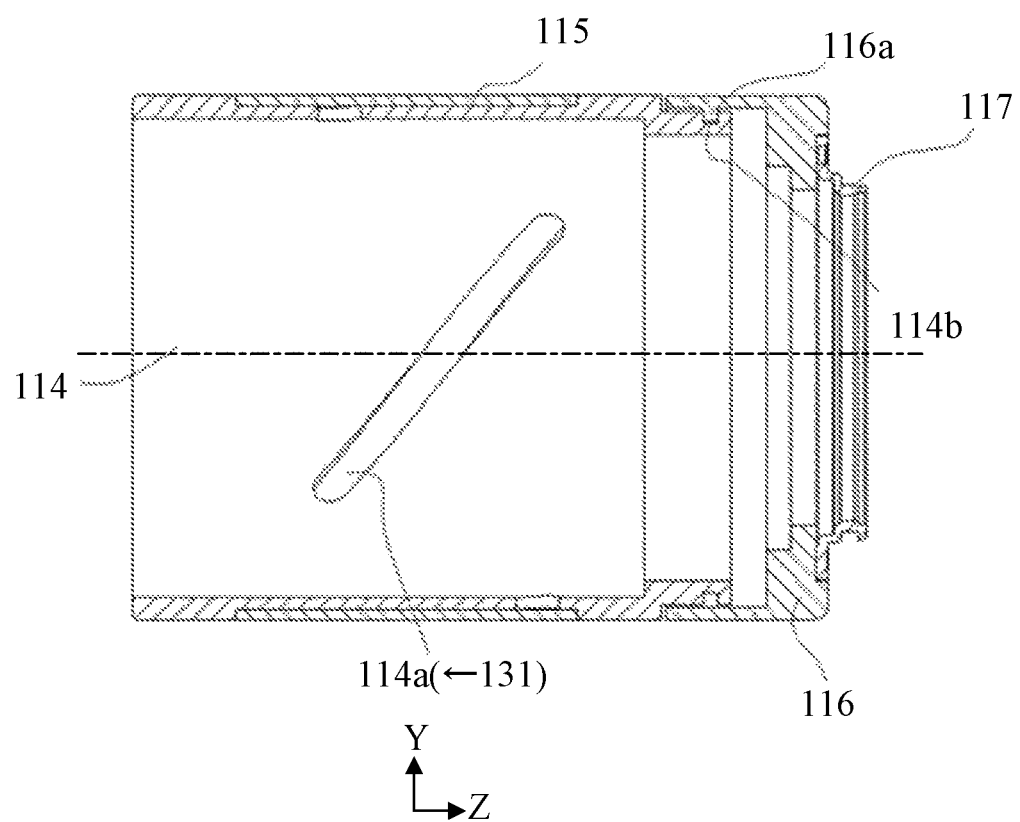
FIG. 11 is a sectional view of a fixed barrel and an operating ring according to the embodiment.

Referring now to FIG. 11, a description will be given of a relationship between the operating ring 114 and the second cam barrel 112. An operating ring 114 is disposed on the outer circumference of the second guide barrel 111. The operating ring 114 is rotatably attached to the fixed barrel 116. A rubber 115 is wound around the outer circumference of the operating ring 114 for a slip prevention when the user rotates the operating ring 114.

The operating ring 114 includes a zoom cam groove portion 114a. As illustrated in FIG. 2A, a zoom cam follower 131 provided to the second guide barrel 111 is engaged with the zoom cam groove portion 114a. The zoom cam groove portion 114a and the zoom cam follower 131 constitute a third cam mechanism.

As the operating ring 114 is rotated, the zoom cam groove portion 114a generates a force for moving the second guide barrel 111 in the optical axis direction together with the zoom cam follower 131. Then, as described above, the sixth cam follower 130 provided in the second guide barrel 111 is guided in the optical axis direction by the sixth guide groove portion 113b in the first guide barrel 113. Thereby, the second guide barrel 111 moves in the optical axis direction together with the second cam barrel 110 integrally engaged with the second guide barrel 111 in the optical axis direction. Since the sixth cam follower 130 is also engaged with the sixth cam groove portion 112d in the first cam barrel 112, as the second guide barrel 111 moves in the optical axis direction, the first cam barrel 112 rotates around the optical axis.

The first cam barrel 112 is rotated and moved in the optical axis direction as the fifth cam groove portion 112e is engaged with the fifth cam follower 113c provided to the first guide barrel 113. As the first cam barrel 112 rotates, the second cam barrel 110 is rotated around the optical axis by the engagement between the rotation connecting pin 141 and the rotation connecting groove portion 110b. When the first cam follower 123 of the linear movement barrel 102 is pressed by the first cam groove portion 110a in the second cam barrel 110 that rotates and moves in the optical axis direction, the linear movement barrel 102 moves in the optical axis direction. At this time, the linear movement barrel 102 (the first linear movement follower 121) is guided in the optical axis direction by the first guide groove portion 111a in the second guide barrel 111.

The interchangeable lens with a high zoom magnification needs to make the overall length in the shortest state (wide-angle state) as short as possible, and to secure a large moving amount of each lens unit in zooming. This embodiment adopts a configuration that moves both the first cam barrel 112 and the second cam barrel 110 in the optical axis direction in zooming, and secures a large moving amount of each lens unit while shortening the overall length in the shortest state.

Further, prior art integrally connects the operating ring 114 to the first cam barrel 112 in the rotating direction, and the rotating amount of the operating ring 114 is equal to the rotating amount of the first cam barrel 112. In order to reduce the operational torque of the operating ring 114, it is necessary to increase the rotating amount of the operating ring 114. However, due to the limited length in the rotating direction of the cam groove portion that can be formed in the first cam barrel 112, the rotating amount of the operating ring 114 could not be increased.

Accordingly, this embodiment connects the operating ring 114 and the first cam barrel 112 with each other via the zoom cam groove portion 114a, and makes the rotating amounts of the operating ring 114 and the first cam barrel 112 different from each other. In other words, this embodiment increases the rotating amount of the operating ring 114 and reduces the operational torque, while providing the cam groove portion into the first cam barrel 112.

The above embodiment can realize a compact lens barrel which can prevent stray light from entering the lens barrel and make large moving amounts of the first and second lens systems.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-013858, filed on Jan. 30, 2018, which is hereby incorporated by reference herein in its entirety.

What is claimed is:

1. A lens barrel comprising:
a first guide barrel configured to guide a linear movement of a first lens system in an optical axis direction;
a first cam barrel rotatable around an optical axis relative to the first guide barrel and including a first cam configured to move the first lens system in the optical axis direction by a rotation of the first cam barrel;
a linear movement barrel configured to hold a second lens system;
a second guide barrel whose linear movement in the optical axis direction is guided by the first guide barrel, the second guide barrel being configured to guide a linear movement of the linear movement barrel in the optical axis direction; and
a second cam barrel movable in the optical axis direction as the second guide barrel moves in the optical axis direction, and rotatable around the optical axis relative to the second guide barrel, and the second cam barrel including a second cam configured to move the linear movement barrel in the optical axis direction by a rotation of the second cam barrel,
wherein the linear movement barrel is disposed between the second guide barrel disposed on an outer circumference of the linear movement barrel and the second cam barrel disposed on an inner circumference of the linear movement barrel,
wherein an outer circumferential surface of the second guide barrel is an outermost surface of the lens barrel when the second guide barrel extends in the optical axis direction relative to the first guide barrel,
wherein the second guide barrel includes a groove portion configured to guide the first guide barrel in the optical axis direction, and
wherein the groove portion is formed as a groove portion that opens radially inwardly and does not perforate the second guide barrel in a radial direction.

2. The lens barrel according to claim 1, wherein the second cam barrel is movable in the optical axis direction integrally with the second guide barrel and rotatable around the optical axis relative to the second guide barrel.

3. A lens barrel comprising:
a first guide barrel configured to guide a linear movement of a first lens system in an optical axis direction;
a first cam barrel rotatable around an optical axis relative to the first guide barrel and including a first cam configured to move the first lens system in the optical axis direction by a rotation of the first cam barrel;
a linear movement barrel configured to hold a second lens system;
a second guide barrel whose linear movement in the optical axis direction is guided by the first guide barrel, the second guide barrel being configured to guide a linear movement of the linear movement barrel in the optical axis direction; and
a second cam barrel movable in the optical axis direction as the second guide barrel moves in the optical axis direction, and rotatable around the optical axis relative to the second guide barrel, and the second cam barrel including a second cam configured to move the linear movement barrel in the optical axis direction by a rotation of the second cam barrel,
wherein the linear movement barrel is disposed between the second guide barrel disposed on an outer circumference of the linear movement barrel and the second cam barrel disposed on an inner circumference of the linear movement barrel, and
wherein the second guide barrel and the first cam barrel include a first cam mechanism configured to rotate the first cam barrel around the optical axis direction as the second guide barrel moves in the optical axis direction.

4. A lens barrel comprising:
a first guide barrel configured to guide a linear movement of a first lens system in an optical axis direction;
a first cam barrel rotatable around an optical axis relative to the first guide barrel and including a first cam configured to move the first lens system in the optical axis direction by a rotation of the first cam barrel;
a linear movement barrel configured to hold a second lens system;
a second guide barrel whose linear movement in the optical axis direction is guided by the first guide barrel, the second guide barrel being configured to guide a linear movement of the linear movement barrel in the optical axis direction; and
a second cam barrel movable in the optical axis direction as the second guide barrel moves in the optical axis direction, and rotatable around the optical axis relative to the second guide barrel, and the second cam barrel including a second cam configured to move the linear movement barrel in the optical axis direction by a rotation of the second cam barrel, wherein the linear movement barrel is disposed between the second guide barrel disposed on an outer circumference of the linear movement barrel and the second cam barrel disposed on an inner circumference of the linear movement barrel, and wherein the first guide barrel and the first cam barrel include a second cam mechanism configured to move the first cam barrel in the optical axis direction relative to the first guide barrel as the first cam barrel rotates around the optical axis.

5. A lens barrel comprising:

a first guide barrel configured to guide a linear movement of a first lens system in an optical axis direction;

a first cam barrel rotatable around an optical axis relative to the first guide barrel and including a first cam configured to move the first lens system in the optical axis direction by a rotation of the first cam barrel;

a linear movement barrel configured to hold a second lens system;

a second guide barrel whose linear movement in the optical axis direction is guided by the first guide barrel, the second guide barrel being configured to guide a linear movement of the linear movement barrel in the optical axis direction;

a second cam barrel movable in the optical axis direction as the second guide barrel moves in the optical axis direction, and rotatable around the optical axis relative to the second guide barrel, and the second cam barrel including a second cam configured to move the linear movement barrel in the optical axis direction by a rotation of the second cam barrel; and an operating ring configured to rotate around the optical axis by a rotational operation, wherein the linear movement barrel is disposed between the second guide barrel disposed on an outer circumference of the linear movement barrel and the second cam barrel disposed on an inner circumference of the linear movement barrel, and wherein the operating ring and the second guide barrel include a third cam mechanism configured to move the second guide barrel in the optical axis direction as the operating ring rotates.

6. The lens barrel according to claim 1, wherein the first cam barrel and the second cam barrel are engaged with each other so that as the first cam barrel rotates around the optical axis, the second cam barrel rotates around the optical axis.

7. The lens barrel according to claim 1, wherein the first lens system includes a plurality of lens units, and wherein the first cam barrel includes a plurality of cams serving as the first cam configured to move each of the plurality of lens units in the optical axis direction.

8. An optical apparatus comprising a lens barrel according to claim 1.

* * * * *